United States Patent
Large et al.

(10) Patent No.: US 7,359,603 B2
(45) Date of Patent: Apr. 15, 2008

(54) CONSTRUCTING PREFORMS FROM CAPILLARIES AND CANES

(75) Inventors: Maryanne Candida Jane Large, West Pymble (AU); Martin Alexander van Eijkolonborg, Newtown (AU); Alexander Argyros, Fairfield Heights (AU); Joseph Zagari, Condell Park (AU); Steven Manos, Picnic Point (AU); John Canning, Carlton (AU); Tom Ryan, Chippendale (AU); Katja Lyytikainon, Bronte (AU)

(73) Assignee: The University of Syndey, Sydney, New South Wales (AU)

( * ) Notice: Subject to any disclaimer, the term of this patent is extended or adjusted under 35 U.S.C. 154(b) by 0 days.

(21) Appl. No.: 10/484,217

(22) PCT Filed: Jul. 22, 2002

(86) PCT No.: PCT/AU02/00975
§ 371 (c)(1),
(2), (4) Date: Feb. 28, 2005

(87) PCT Pub. No.: WO03/009026
PCT Pub. Date: Jan. 30, 2003

(65) Prior Publication Data
US 2005/0147366 A1 Jul. 7, 2005

(30) Foreign Application Priority Data
Jul. 20, 2001 (AU) .................................... PR6491
Jul. 20, 2001 (AU) .................................... PR6494
Jul. 23, 2001 (AU) .................................... PR6537

(51) Int. Cl.
*G02B 6/02* (2006.01)

(52) U.S. Cl. ...................................... 385/125; 385/123

(58) Field of Classification Search ................. 385/125
See application file for complete search history.

(56) References Cited

U.S. PATENT DOCUMENTS 5,155,792 A 10/1992 Vali et al.

(Continued)

FOREIGN PATENT DOCUMENTS

FR 2657556 A1 9/1990

(Continued)

OTHER PUBLICATIONS

Cregan et al., "Single-Mode Photonic Band Gap Guidance of Light in Air," Science, Sep. 3, 1999, pp. 1537-1539, vol. 285.

(Continued)

*Primary Examiner*—Sung Pak
(74) *Attorney, Agent, or Firm*—Wolf, Greenfield & Sacks, P.C.

(57) ABSTRACT

The invention relates to a method of producing a preform for a holey optical fiber, and more particularly, to a method of producing polymer holey optical fiber using novel capillary and cane designs that allow a construction of complex holey structures. The capillaries may have a complex internal structure including multiple holes, holes of non-circular shape, off-center holes, holes of different sizes, or any combination of these. The canes may have a complex external shape to define interstitial holes when the canes arc combined in a stack (see FIG. 1). The capillaries and canes may be made of different materials and combined within the same structure.

48 Claims, 3 Drawing Sheets

U.S. PATENT DOCUMENTS

| | | | |
|---|---|---|---|
| 5,802,236 A | 9/1998 | DiGiovanni et al. | |
| 6,064,511 A | 5/2000 | Fortmann et al. | |
| 6,134,043 A | 10/2000 | Johnson et al. | |
| 6,444,133 B1 * | 9/2002 | Fajardo et al. | 216/24 |
| 6,470,127 B2 * | 10/2002 | Voevodkin | 385/123 |
| 6,718,105 B2 * | 4/2004 | Hasegawa et al. | 385/123 |
| 2002/0031319 A1 | 3/2002 | Wang | |

FOREIGN PATENT DOCUMENTS

| | | |
|---|---|---|
| GB | 2350904 | 12/2000 |
| JP | 2000-035521 | 2/2000 |
| WO | WO 99/00685 A1 | 1/1999 |
| WO | WO 99/49435 A1 | 9/1999 |
| WO | WO 99/64903 A1 | 12/1999 |
| WO | WO 99/64904 A1 | 12/1999 |
| WO | WO 00/16141 A1 | 3/2000 |
| WO | WO 00/37974 A1 | 6/2000 |
| WO | WO 00/49435 | 8/2000 |
| WO | WO 00/49436 A1 | 8/2000 |
| WO | WO 00/60388 A1 | 10/2000 |
| WO | WO 01/42829 A2 | 6/2001 |
| WO | WO 02/16984 A1 | 2/2002 |

OTHER PUBLICATIONS

Steel, M.J. and Osgood, R.M., "Elliptical Photonic Crystal Fibres", Optics Letters 26, 4, 229-231.

Birks, T.A., et al., "Endlessly Single Mode Photonic Crystal Fibre", Optics Letters, 22, 13, Jul. 1, 1997, pp. 961-963.

Annis, P., et al., "High Resolution Tracking Using Large Capillary Bundles Filled with Liquid Scintiller", Nuclear Instruments and Methods in Physics Research A, 449 (2000) pp. 60-80.

Fink, Yoel, et al., "Guiding Optical Light in Air Using An All Dielectric Structure", J. Lightwave Tech, 17, 11, 1999 pp. 2039-2041.

* cited by examiner

CONSTRUCTING PREFORMS FROM CAPILLARIES AND CANES

FIELD OF THE INVENTION

This invention relates to a method of producing a preform for a holey optical fibre, and more particularly, to a method of producing capillary and cane designs that can be combined into a stack and fused to allow the construction of complex structures that will be of use for wave-guiding applications.

The invention also relates to novel capillary and cane designs for wave guiding applications, and in particular to capillary and cane designs that can be combined and joined so as to allow the construction of complex structures for use in wave guiding applications, and in particular for the production of photonic crystal optical fibres.

BACKGROUND TO THE INVENTION

Any discussion of the prior art throughout the specification should in no way be considered as an admission that such prior art is widely known or forms part of common general knowledge in the field.

There is considerable interest in making complex holey structures that can subsequently be drawn into a microstructured fibre. This is currently done by stacking and fusing capillaries or canes.

Photonic crystal fibres are commonly made in glass. The fabrication technique used is capillary stacking with thermal fusing. The general technique used has been to use glass canes or capillaries having a single central hole. Canes are solid rods, without any internal holes, whilst capillaries are elongated structures that have one or more holes running through them. The capillaries used to date have usually been of circular cross-section, and had a single central hole. There have been a number of examples in which holes of different sizes were combined in one structure, but this has generally proved difficult because the self-packing properties of same-sized rods and canes breaks down when different diameters are used. In this case there is a need to "pack" the structure to support it, and prevent it collapsing. Maintaining the hole structure in glass holey fibres is very difficult, and requires a high degree of control over both the preform fabrication and drawing processes. It is likely that for this reason very few structures that deviate from the same-sized canes or single holed capillary stack have been reported. In addition, any deviation from the single central holed capillary requires control of the rotational orientation of the capillary.

Whilst attempts have been made to use glass canes and capillaries of hexagonal cross-section with multiple holes, difficulties with fusing and distortion have been encountered resulting in poor quality fibre.

It is an object of the present invention to overcome or ameliorate at least one of the disadvantages of the prior art, or to provide a useful alternative.

SUMMARY OF THE INVENTION

To this end, one aspect of the present invention provides a method of producing a preform for a holey optical fibre comprising providing a series of preform elements adapted to be connected together to construct said preform with a series of holes therein, each hole being formed in an element or formed by combining two or more elements.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

A further aspect of the present invention provides a preform for a holey optical fibre, said preform comprising providing a series of preform elements to be connected together to construct said preform with a series of holes therein, each air hole being formed in an element or formed by combining two or more elements.

A further aspect of the present invention provides a method of producing a preform for a polymer holey optical fibre comprising providing a series of preform elements adapted to be connected together to construct said preform with a series of holes therein, each hole being formed in an element or formed by combining two or more elements.

A further aspect of the present invention provides a preform for a polymer holey optical fibre, said preform comprising providing a series of preform elements to be connected together to construct said preform with a series of holes therein, each air hole being formed in an element or formed by combining two or more elements.

Preferably, the rotational orientation of the capillaries and canes within the stack can be controlled by means of stackable cross-sections, such as hexagonal, triangular or rectangular cross-sections, and/or by means of a slotted structure.

In the context of this specification it should be noted that the terms "capillaries" and "canes" are not to be associated with a particular size. For example, in the context of this specification, capillaries and canes may have dimensions up to the order of centimetres in diameter. The capillaries may have an internal structure of one or more holes, which may or may not be circular, and which may or may not be of the same dimensions. The canes may have a complex external cross-section to define the shape of the interstitial holes.

The canes or capillaries may be made of a variety of materials and combined within the same structure.

The canes and capillaries may fit together either concentrically, or within stacked structure, or a combination of the two. They may then be fused together either prior to drawing the fibre, or as the preform is drawn to fibre.

Standard sized capillaries and canes containing different hole structures, canes, and possibly canes and capillaries made of different materials could be used as "Lego™ pieces" to rapidly construct a very large range of structures. This approach lends itself to automation of the assembly process.

Using the range of capillary and cane designs described here it is possible obtain any desired cross-section for a preform for an optical fibre. The cross-section may include a complex pattern of holes, which may be periodic, and may additionally include controlled variations in the material properties.

It is to be noted that the various aspects of the present invention may be used to produce a variety of photonic structures, including those for non-optical wavelengths.

Advantageously, considerable complexity can be introduced into a preform structure and resulting optical fibre by varying the external shape of the capillaries and canes to affect the stacking properties, changing the internal pattern of the holes within the capillaries, for example by using off-centre holes, holes of different sizes, multiple holes, and holes of non-circular shape, or any combination of these. Complex holey structures can be obtained either by combining capillaries, or canes, or a mixture of the two. The resulting hole structure will combine the holes in the capillaries with interstitial holes. Canes can be designed to have an external shape such that when they are fitted together the interstitial holes have a particular geometry, for example, the interstitial holes may be circular. The advantage of this approach is that it is usually easier to produce solid structures rather than voided structures.

Additionally, the methodology of the present invention enables the use of relatively large cane and capillary elements. This in turn aids in the handling and positioning of the elements when constructing a preform of the desired structure. Furthermore, by using relatively large cane and capillary elements (for example one centimetre or greater in diameter) some degree of deformation of the individual elements can be accommodated without deforming the main structure of the preform.

BRIEF DESCRIPTION OF THE DRAWINGS

Preferred embodiments of the invention will now be described, by way of example only, with reference to the accompanying drawings in which.

DETAILED DESCRIPTION OF THE INVENTION

Whilst the following description of the various aspects of the invention are directed to preforms formed from polymer materials, it is to be noted that where applicable the various aspects of the invention can also be employed in the manufacture of preforms from other materials or combination of materials, including glass.

One aspect of the present invention is directed to capillary and cane designs that will allow the fabrication of complex structures for use in wave guide applications. In particular, the canes and capillaries can be used to produce preforms for photonic crystal fibres.

A fundamental problem to be addressed in the use of complex capillaries is the control of rotational orientation. The problem is addressed by using two approaches: stackable cross-sections and slotted structures that hold the canes or capillaries in a particular defined position. It is to be noted that these two features (stackable cross-sections and slotted structures) may not be required for the whole length of the preform. The stacking and slotting may be restricted to a part of the preform that is not drawn but serves to hold the canes and capillaries in place. The structure may also be held in place by external means, which allows for a structure where all or some of the canes or capillaries do not touch the other elements. Control of the positional orientation can also be achieved by means of slotted structures that hold the canes or capillaries in a defined position.

Figure 1:
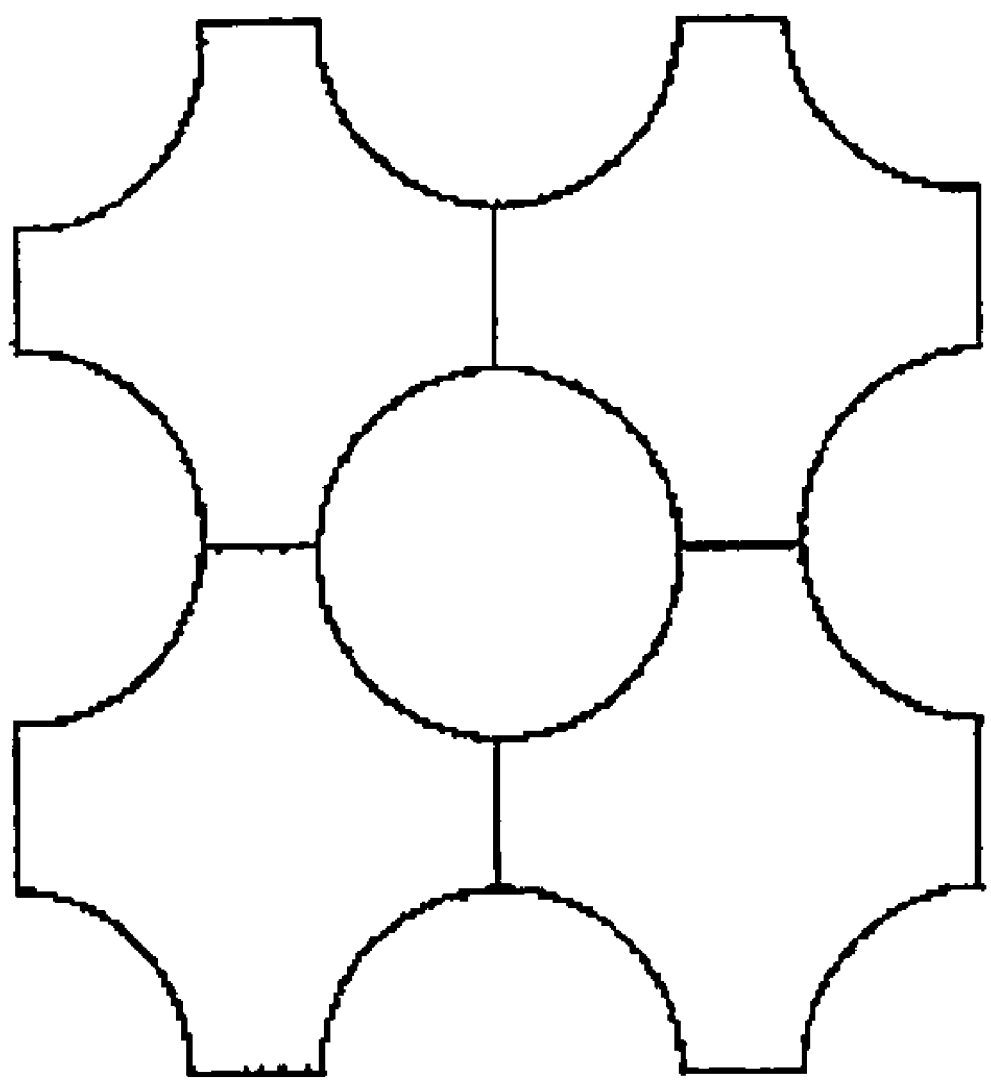
FIG. 1 illustrates a circular interstitial hole structure formed by a group of adjacent canes.
Figure 2A:
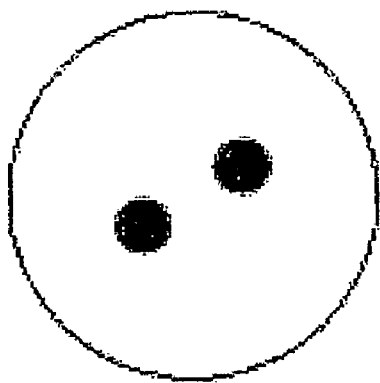
FIGS. 2a to 2d illustrate examples of the types of holes which may be included in capillaries as a result of the present invention.
Figure 2B:
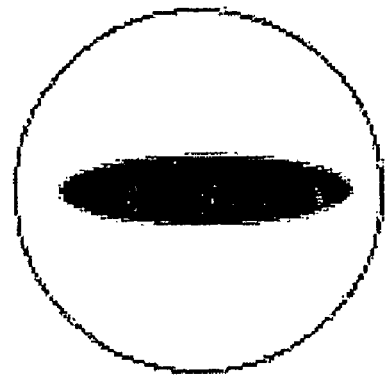
Figure 2C:
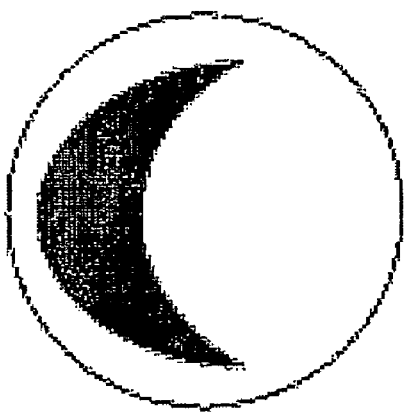
Figure 2D:
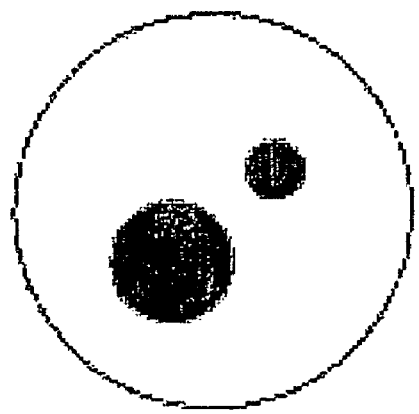

In one embodiment, the desired holes running through the preform are formed in separate elements, for example, in a capillary tube. In another embodiment, the holes are formed by the combination of one or more adjacent elements. An example of a circular hole structure formed using canes is depicted in FIG. 1.

The elements themselves can be in the form of longitudinally extending elements such as the capillaries and canes mentioned above. In an alternative embodiment, laterally extending plates or discs, with or without hole structure, can be stacked so as to form the preform.

Each element forming the preform can be produced from an identical material or from a different material. The elements themselves can be of a standard size and shape and connected together in a conventional fashion, such as by means of tongue and groove, or pin and slot, so as to form the desired preform and array of holes therethrough. Such a configuration allows for the fixing of the rotational and positional orientation of the capillary or cane element. Advantageously, such a construction lends itself to automated production of each element and the preform itself.

Alternatively, for specific or complex applications individually designed elements can be prepared which, when combined, form the desired preform structure.

The preform elements can be prepared by conventional techniques. For example, with polymer material these include, but are not limited to, casting, extrusion, injection moulding, or similar.

A variety of chemical or physical fusing techniques may be used to form the preform from the individual elements.

For polymers, one such technique is chemical fusing wherein a monomeric material or polymeric/monomeric mixture is used to surround the air holes formed by the various elements. Preferably, the air holes are sealed to avoid ingress of the monomeric or polymeric/monomeric mixture. This technique applies to air holes formed in a single element or air holes formed by co-joined elements.

In another process, solvent is applied to soften the exterior surface of each element, the elements being fused by pressing them together. The solvent can be applied in fluid, gaseous or vapour form.

Another alternative is thermal fusing where heat is applied to the various elements. This can be combined with pressing the elements together. Alternatively, such pressure can arise from the thermal relaxation of stress that is present in the elements, which can lead to a controlled amount of expansion of the individual elements. If expansion of the overall structure is restricted, this will result in the pressing of the elements together. Physical fusing can also be applied by, for example, application of irradiation to the elements.

It should also be recognised that each of these techniques can be assisted by providing, for example, a sleeve of polymeric material in to which the elements are placed. As will be appreciated by persons skilled in the art, upon polymerisation, such a polymeric material may shrink. This may in itself serve to provide or assist binding of the various elements of the preform.

The rotational orientation of the capillaries and canes within the stack can be controlled by means of "stackable" cross-sections (such as hexagonal, triangular or rectangular), or by means of a slotted structure.

The capillaries may have an internal structure of one or more holes, which may not be circular, or of the same dimensions. The canes may have a complex external cross-section to define the shape of the interstitial holes.

The canes or capillaries may be made of a variety of materials and combined within the same structure. Useful material variations in polymers include different transparent polymers, grafted polymers, polymers with inclusions, doped polymers, porous polymers, and liquid crystal polymers. Similarly, it is possible to use glass materials including, for example, glasses with different dopants, and glasses with decreased viscosity at lower temperatures.

The canes and capillaries may be fitted together either concentrically, or within stacked structure, or a combination of the two and subsequently fused together. It should be noted that the possibility of casting material around the capillaries or canes means that in principle the structures do not have to be stackable.

Standard sized capillaries and canes containing different hole structures, canes, and possibly canes and capillaries made of different materials could be used to rapidly construct a large range of structures. This approach lends itself to automation of the assembly process.

Using the range of capillary and cane designs described here it is possible to obtain almost any desired cross-section for a preform for an optical fibre. The cross-section may include a complex pattern of holes, which may be periodic, and may additionally include controlled variations in the material properties.

Polymers offer certain advantages over glass. They are more easily processed, so that a number of techniques can be used to make the canes or capillaries. Polymers can be readily cast or extruded, in addition to being drilled and machined. For example, the capillaries or canes could be "sleeved". It should be noted that the external surface area to volume ratio of the capillaries is important in the fusing process. For fusing to occur without distortion of the hole structure, the layer that is softened or modified in the fusing process must not compromise the material that defines the hole structure. Preferably, the fusing method only affects the capillaries or canes to be fused in a superficial level, without affecting the internal structure. The capillaries or canes formed in these ways can then be drawn down, if necessary, to the desired dimensions. Once the capillaries or canes are formed, there are a large variety of ways in which they can be fused, unlike the single method (thermal fusing) used for glass. The possibility of chemical fusing, including casting around the canes or capillaries greatly enhances the number options available in polymers. For example, by casting around the canes or capillaries, it is possible to combine objects that do not stack neatly, which is impossible for glass. Finally the composition of polymers can be varied in many more ways than glass, and by tailoring properties such as molecular weight and additives, it is possible to adjust the rheology of different polymers so that they maintain compatibility during drawing. Doping, grafting and inclusions can all be used to modify the optical and other properties of the canes and capillaries. Examples of modifications that may be considered are inclusions so as to modify the refractive index, non-linear optical polymers, conducting polymer systems, polymers with gain properties (suitable for use in lasers), and polymer systems with enhanced electro and magneto-optic performance.

Novel aspects of the capillary and cane designs of the present invention are as follows:

Stackable External Cross-Sections

Whilst attempts have been made to use glass canes and capillaries of hexagonal cross-section with multiple holes, difficulties have been encountered. For example, the many holed glass capillary suffers from shrinking with respect to the hexagonal canes, leading to poor fusing of the canes and capillaries. Furthermore, the outer hexagonal surfaces become distorted, thereby adversely affecting the packing of the canes and capillaries. As a consequence, the resulting fibre is of poor quality.

Advantageously however, the present invention enables the use of stackable capillaries with a pattern of holes that have the appropriate symmetry it is possible to make the stack relatively insensitive to rotational orientation. For example by using a hexagonal external cross-section the hexagons will tend to align themselves and pack neatly, without spaces between adjacent capillaries. Similarly, canes that have a non-circular cross-section can be made stackable by using suitable shapes (eg. square, triangular or hexagonal, with modifications to produce the desired hole structure).

By using other stackable capillary designs, such as a square or triangular cross-section, it is also possible to vary the symmetry of the lattice structure.

A variety of photonic crystal components can also be envisaged, for which control of possible twisting and bending in the fibre would be essential. For these applications it would be advantageous draw the components from a preform with a suitable cross-section (for example, rectangular) so that they could be easily packaged.

Slotted Capillaries and Canes

The shape of the capillaries and canes may be designed so that they either slot together like a jigsaw or into another structure. For example hexagonal capillaries may be slotted into a cast honey-comb structure, and then be fused together. This allows both their position in the whole structure and rotational orientation to be tightly controlled.

It should be noted that the slotted structure does not need to be located in the section of the preform which is drawn.

Multiple Holed Capillaries and Related Canes

Once the problem of positional and rotational orientation is addressed, it immediately becomes feasible to have many-holed capillaries. These are desirable because they offer a way of rapidly assembling the large number of holes and complexity of structures needed for many photonic crystal fibre applications. A small number of many-holed capillaries can be arranged and fused more readily and accurately than a large number of single holed capillaries. Multiple holed capillaries should have a cross-section which is inherently stackable, or which is held in place by a suitable structure such as tongue and groove mechanism or external jig. Stackable cross-sections include hexagonal, triangular, rectangular, ribbon structures etc. Similarly, canes designed to give interstitial holes can be designed to define multiple holes in combination, for example by using a ribbon structure in which a large number of half-holes. Similarly, "ribbon" capillaries, similar to ribbon wire, could also be easily stacked.

In terms of chemical fusing for example, the issue of wetting the capillaries is an issue when trying to cast around the structure. The larger the capillary, the simpler it is to cast around it.

Size and Shape Variations in the Hole Structures

An additional level of complexity can be introduced to the structure once the positional and rotational orientation is fixed, by allowing size and shape variations in the hole structure. By restricting the position locking to a region of the preform to the part that is not drawn, it is possible for capillaries and canes of any cross-section to be combined in the drawing region. In other words the canes or capillaries can have any external shape and any pattern of holes, provided that their position is adequately locked in some region of the preform.

Examples of some of the types of holes which can be included in capillaries include off centre holes, non circular holes, different sized holes etc. Examples of different types of hole structures are illustrated in FIGS. 2a to 2d.

Such structures have many possible uses in photonic crystal fibres. Elongated holes for example could be used to build up approximations to ring structures or reduce bending losses. Different sized holes could be used to establish multiply periodic structures, which have for example, more an extended band gap, or several band gaps. Changes in the cross-section can also be used to design cross-sections for particular applications such as polarisation and dispersion control, couplers etc.

Concentric Cylindrical Capillaries

Figure 3:
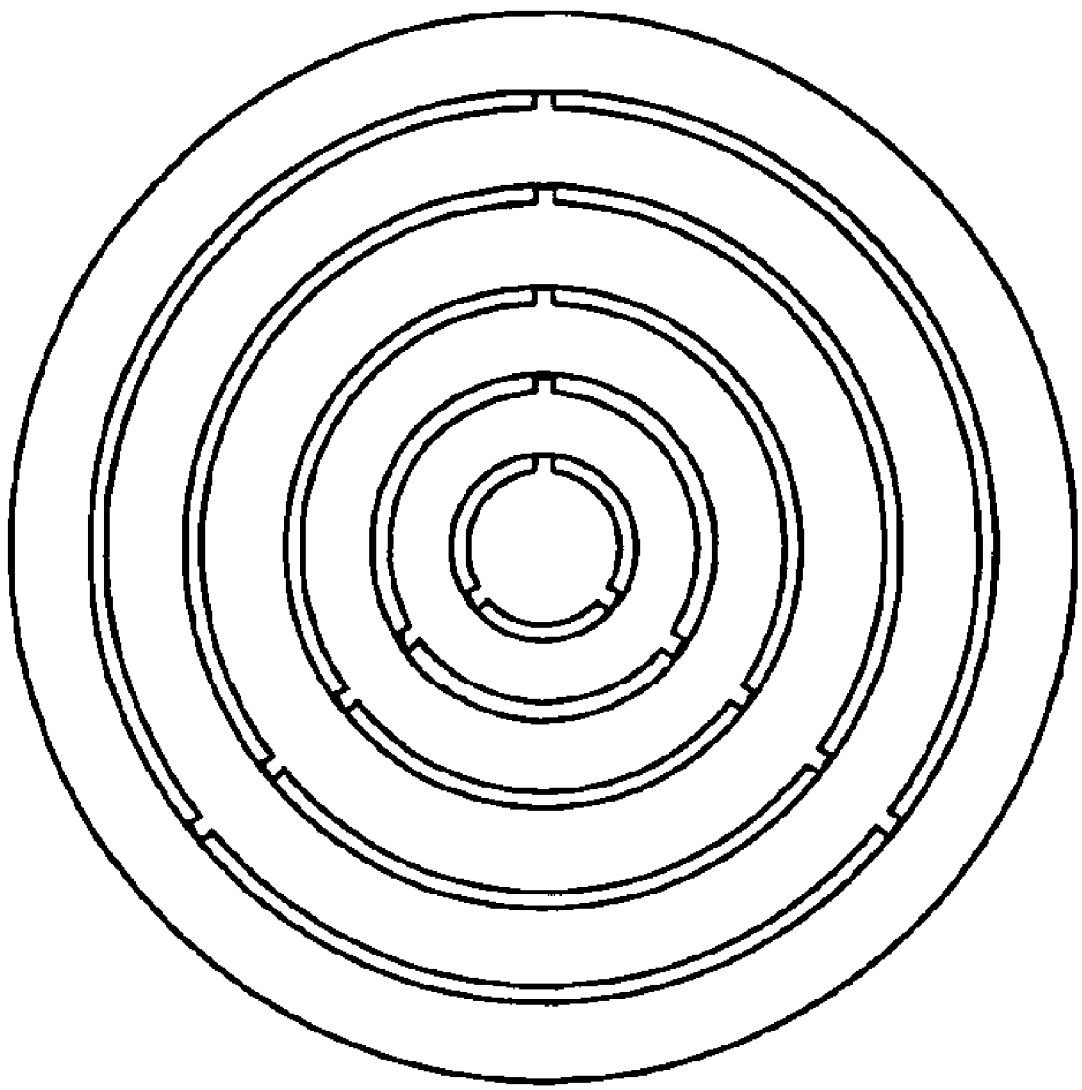
FIG. 3 illustrates a concentric capillary formation which can be formed by the present invention.

Concentric capillaries with or without protrusions on their outer surface can be arranged to form structures that are, or closely approximate, Bragg structures. This allows for the fabrication of Bragg fibres in which the guiding is achieved by Bragg reflection off the multi-layered concentric cladding of the fibre. Fusing could occur where adjacent cylinders touch each other. By varying the composition of the cylinders, or treating their surfaces, it is possible to change their optical properties. Protrusions extending from the capillaries can be used to allow nearly complete air rings to be formed. FIG. 3 illustrates the way that nearly complete air rings could be formed by this process.

In a further development, capillaries which include hole structures are concentrically stacked.

Twisted Structures

The large refractive index contrast found in holey fibres makes them particularly suitable for controlling the polarisation properties of the resulting structures. Spinning or twisting the fibre as is it is being drawn means that circularly birefringent or low birefringence fibres can be produced.

Combinations of Materials

Capillaries and canes of different composition may also be combined in the stack that forms the preform. In particular the use of doped materials, nano-composite materials for example using rare-earth or metallic inclusions, birefringent and porous materials may be used.

Polymers allow a huge variety of compositions to be used. Polymers of different refractive indices may be combined, or polymers that are grafted or doped with new functionalities, such as dyes, photochromic materials, birefringent materials etc. Most of these materials decompose at the processing temperatures used for glasses. Using liquid crystalline polymers it is possible to produced molecular ordering of the material, which would be useful for example for polarisation control. Polymers for example can be made chiral, a possibility that does not exist for glass. Nano-composite materials may also be used in which inclusions such as metals, rare earths, high refractive index materials etc. are used to modify properties such as optical non-linearity, magneto-optic effect, the electro-optic effect, the gain of the material, the electrical conductivity, etc. By modifying polymer properties such as molecular weight etc. it is possible to ensure the drawing compatibility of different polymeric materials—a feature that is not available in glass. In other materials, such as glasses, a more limited range of chemical modifications are possible. However, the use of doped material, for example by way of modified chemical vapour deposition or chelation, is possible.

Additionally, techniques such as sleeving and coating are applicable so as to produce capillaries and canes formed from combinations of materials.

Combination of Structures and Composition

All of the canes and capillaries described here can be combined to form complex structures. For example, capillaries and canes of standard external cross-section but differing internal cross-section and composition could be combined like "Lego™ pieces" to rapidly construct complex structures. This offers the possibility to completely control the cross-sectional of a preform, including control of the material properties. An attractive feature of this approach is that it lends itself to automation. Using a set of standard compatible canes and capillaries it is possible to build up structures "to order".

Additionally, it is possible to form capillaries and canes from combinations of different materials. For example, it is possible to produce capillaries or canes with multiple layers of different materials by techniques such as sleeving or coating or other techniques.

It is also to be noted that capillaries and rods and preforms of complex structures and composition may be constructed by successive drawing and sleeving as well as by stacking, a process which allows the size of the final structure to be easily controlled Capillaries and rods formed by this technique can subsequently be included in a stacked structure.

There are a large number of applications in which the composition and structure can both be varied to obtain particular optical outputs. These applications define a series of hybrid fibres, which combine photonic crystal fibre structures with variations in composition that may be produced by conventional processing techniques, or by simply including capillaries or canes of different composition. Some fibres of interest that could be produced by this approach include:

- single or multiple core photonic fibres in which with doping in the inner regions to generate particular transverse modes for laser, amplifier and possibly dispersion control applications.
- Bragg hole fibres that have chirality added (for example by twisting) and dopants to produce a circularly birefringent laser output when feedback is added.
- use of Bragg structures with appropriate spacings in photonic fibres to obtain Fresnel waveguides.

Variations along the Length of the Preform

The same fusing and assembly techniques can be applied to produce variations along the length as well as across the cross-section of the preform. This may be used to produce variations in structure, such as chirality, material, or simply to extend the length of the preform.

The preform may comprise a plurality of interconnected capillaries and canes. When connected together, these capillaries and canes combine to form a preform suitable for the production of holey fibres. It is to be noted that the capillaries and canes may be predrawn.

The designs described here address the problems of maintaining positional and rotational orientation of the capillaries and canes, which in turn allows multiple hole structures, non-circular holes and canes or capillaries of different composition to be combined. In addition, the present invention provides a way of simply producing or approximating ring structures used for Bragg fibres. The combination of these techniques allows unprecedented control of the cross-sectional arrangement and composition of the fibre. The designs described also allow a methodology that can be easily automated, and can produce easily customisable structures.

Some of the many applications that would use the sorts of structures possible with the novel capillary and cane design of the present invention are:

- low bending loss fibres. It is known that increasing the hole size as a function of distance from the core will reduce bending losses
- extended bandgap or multiple band gap fibres
- fibres for dispersion control
- fibres for polarization control
- fibres with Bragg structures multi-core fibres and multi-structure fibres, in which more than one light guiding area is created within the fibre
fibres for high optical non-linearity, electro- and magneto-optic effect, fibres with electrically conducting elements, gain etc.
fibre sensors.

Although the invention has been described with reference to specific examples it will be appreciated by those skilled in the art that the invention may be embodied in many other forms.

The invention claimed is:

1. A preform for a holey optical fibre comprising a plurality of preform elements connected together, said preform elements being of a cross-sectional profile which retains said elements in a predetermined position and rotational orientation with respect to adjacent preform elements, and said preform elements comprising at least one of: (a) capillaries having one or more non-circular holes; and (b) canes having complex external cross-sections that define interstitial holes.

2. The preform as claimed in claim 1 wherein said holes in said preform are formed in separate elements.

3. The preform as claimed in claim 1 wherein said holes are formed by the combination of one or more adjacent preform elements.

4. The preform as claimed in claim 1 wherein each element forming the preform is produced from an identical polymeric material.

5. The preform as claimed in claim 1 wherein said elements forming the preform are produced from different materials.

6. The preform as claimed in claim 1 wherein the elements are fitted together with concentrically, or within a stacked structure, or a combination of the two.

7. An optical fibre formed from a preform as claimed in claim 1.

8. A single core optical fibre formed from a preform as claimed in claim 1.

9. A multiple core optical fibre formed from a preform as claimed in claim 1.

10. A Bragg fibre formed from a preform as claimed in claim 1.

11. A Fresnel wave guide formed from a preform as claimed in claim 1.

12. A birefingent optical fibre formed from a preform as claimed in claim 1.

13. A fibre coupler formed from a preform as claimed in claim 1.

14. Elements of a fibre sensor formed from a preform as claimed in claim 1.

15. An optical fibre formed from a preform as claimed in claim 1, and adapted to exhibit circular birefringence properties.

16. An optical fibre formed from a preform as claimed in claim 1, wherein the preform is produced from material(s) selected for high optical non-linearity, electro-and magneto-optic effect, electrical conductivity and/or optical gain.

17. A Bragg hole fibre formed from a preform as claimed in claim 1.

18. A method of producing a preform for a holey optical fibre comprising combining a plurality of preform elements together to construct said perform with one or more holes therein, said preform elements being of a cross-sectional profile which retains said elements in a predetermined position and rotational orientation with respect to adjacent preform elements, and said preform elements comprising at least one of: (a) capillaries having one or more non-circular holes; and (b) canes having complex external cross-sections that define interstitial holes.

19. The method as claimed in claim 18 wherein said one or more holes are formed in separate preform elements.

20. The method as claimed in claim 18 wherein said one or more holes are formed by the combination of one or more adjacent preform elements.

21. The method as claimed in claim 18 wherein each element forming the preform is produced from an identical material.

22. The method as claimed in claim 18 wherein said elements forming the preform are produced from different materials.

23. The method as claimed in claim 18 wherein said preform elements fit together either concentrically, or within a stacked structure, or a combination of the two.

24. The method as claimed in claim 18 wherein said elements are fused together prior to drawing the preform to form said holey optical fibre.

25. The method as claimed in claim 24 wherein said elements are thermally fused together prior to drawing the preform to form said holey optical fibre.

26. The method as claimed in claim 24 wherein said elements are chemically fused together prior to drawing the preform to form said holey optical fibre.

27. The method as claimed in claim 18 wherein said preform elements have a non-circular cross-sectional profile.

28. The method as claimed in claim 27 wherein said preform elements have a hexagonal cross-sectional profile.

29. The method as claimed in claim 27 wherein said preform elements have a triangular cross-sectional profile.

30. The method as claimed in claim 27 wherein said preform elements have a rectangular cross-sectional profile.

31. The method as claimed in claim 18 wherein said preform elements include capillaries having one or more non-circular holes therein.

32. The method as claimed in claim 18 wherein said preform elements include canes wherein adjacent canes combine to form said one or more holes.

33. The method as claimed in claim 18 wherein said preform elements are of complimentary cross-sectional profiles such that adjacent elements are mechanically engaged with each other to retain said elements in said predetermined position and rotational orientation.

34. The method as claimed in claim 18 wherein said preform elements are formed from a polymer material.

35. The preform as claimed in claim 1 wherein said preform elements have a non-circular cross-sectional profile.

36. The preform as claimed in claim 35 wherein said preform elements have a hexagonal cross-sectional profile.

37. The preform as claimed in claim 35 wherein said preform elements have a triangular cross-sectional profile.

38. The preform as claimed in claim 35 wherein said preform elements have a rectangular cross-sectional profile.

39. The preform as claimed in claim 1 wherein said preform elements include capillaries having one or more non-circular holes therein.

40. The preform as claimed in claim 1 wherein said preform elements include canes wherein adjacent canes combine to form said one or more holes.

41. The preform as claimed in claim 1 wherein said preform elements are of complimentary cross-sectional profiles such that adjacent elements are mechanically engaged with each other to retain said elements in said predetermined position and rotational orientation.

42. The preform as claimed in claim 1 wherein said preform elements are formed from a polymer material.

43. The preform as claimed in claim 1, wherein said preform includes a plurality of non-circular holes.

44. The perform as claimed in claim 1, wherein said preform elements include adjacent canes that form one or more circular holes.

45. The preform as claimed in claim 1, wherein said one or more preform elements includes a hole structure, the orientation of said hole structure within said preform being dependent on the rotational orientation of the preform element within said preform.

46. The method as claimed in claim 18, wherein said preform includes a plurality of non-circular holes.

47. The method as claimed in claim 18, wherein said preform elements include adjacent canes that form one or more circular holes.

48. The method as claimed in claim 18, wherein said one or more preform elements includes a hole structure, the orientation of said hole structure within said preform being dependent on the rotational orientation of the preform element within said preform.

* * * * *